No. 853,225. PATENTED MAY 14, 1907.
W. H. COLDWELL.
SHAFT BEARING.
APPLICATION FILED JAN. 5, 1906.
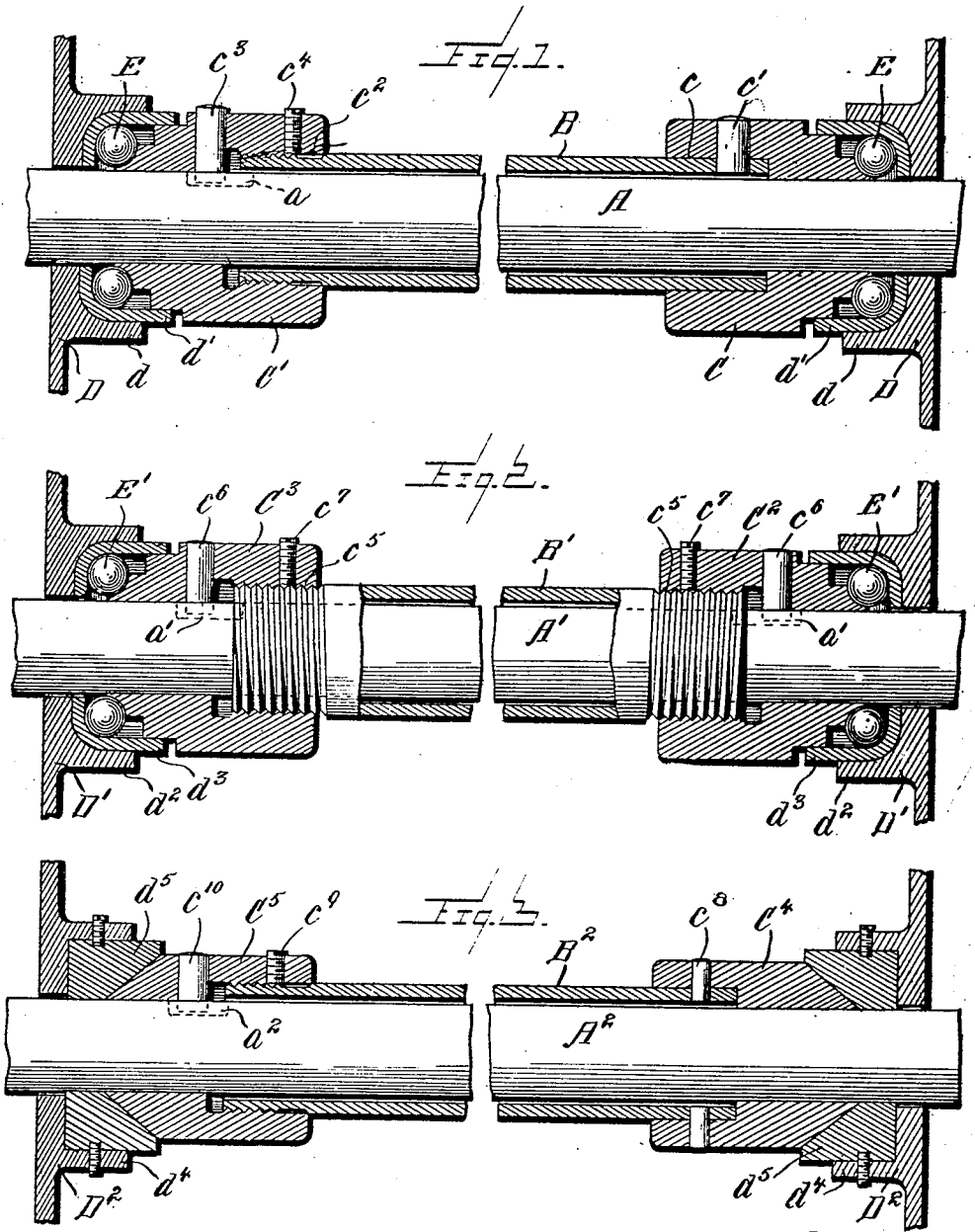

UNITED STATES PATENT OFFICE.

WILLIAM H. COLDWELL, OF NEWBURGH, NEW YORK.

SHAFT-BEARING.

No. 853,225. Specification of Letters Patent. Patented May 14, 1907.

Application filed January 5, 1906. Serial No. 294,759.

*To all whom it may concern:*

Be it known that I, WILLIAM H. COLDWELL, a citizen of the United States, residing at Newburgh, in the county of Orange and State of New York, have invented certain new and useful Improvements in Shaft-Bearings; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one form in which I have contemplated embodying the invention and said invention is fully disclosed in the following description and claims.

Referring to the said drawings, Figure 1 represents a view partly in section of a shaft and ball bearings, embodying my invention. Fig. 2 is a similar view showing a slight modification. Fig. 3 is a similar view showing my invention applied to cone bearings.

My invention relates particularly to means for adjusting ball or cone bearings and further of connecting the bearings to a shaft, in such manner that a slight amount of end play of the shaft may be permitted without affecting the bearings in any way.

In Fig. 1 I have shown my invention applied to ball bearings for supporting a rotating shaft. In this figure A indicates the shaft on which are placed two cones C, C' provided with the usual ball races. The cones are fitted easily on the shaft so as to permit the shaft to move longitudinally through them, and one of said cones, C is provided with a recess $c$ to receive one end of a spreading or adjusting tube or sleeve B which surrounds the shaft A but need not fit the same, the tube B being rigidly secured to cone C, in this instance, by a pin $c'$. The other cone C' is also provided with a recess $c^2$ to receive the tube B the inner walls of the recess being threaded to engage threads on the exterior of the end of the tube B, as shown at the left in Fig. 1. In order to cause the shaft, sleeve and cones to rotate together a pin $c^3$ extends through one of the cones as C' and enters a longitudinal keyway or groove $a$ in the shaft A, and cone C' is also provided with a set screw $c^4$ to engage the threaded portion of the sleeve B to lock it in its adjusted position. D, D indicate stationary parts for supporting the bearings which parts are provided in any suitable manner with ball races. In this instance, I have shown the stationary parts D D provided with annular flanges $d$ carrying steel cups $d'$ having ball races formed therein, and the shaft A will ordinarily extend through apertures in the cups and stationary parts as shown. E indicates balls which are interposed between the cones and their respective cups in the usual manner. In order to adjust these bearings, the set screw $c^4$ is loosened and the sleeve B is rotated slightly in either direction with respect to cone C' until the proper adjustment of the bearings is secured when the set screw is tightened. The engagement of the pin $c^3$ with the shaft A will prevent cone C' from rotating while the sleeve B is turned, and it will be noted that the two bearings will be adjusted simultaneously. It will also be seen that the walls of the sleeve B, which are exterior to the shaft extend from one cone to the other and form a spreader which holds the cones permanently in proper relation to their bearings, while a simple means is thus afforded of adjusting both cones simultaneously when required.

In Fig. 2, I have shown a slight modification of the invention, in which A' indicates the shaft $C^2$, $C^3$, the cones having recesses $c^5$ each of which is interiorly screw threaded and B' indicates the spreading sleeve which is provided at its ends with right and left hand threaded portions as shown and is screwed into the cones. Each cone is provided with a pin $c^6$ engaging a slot $a'$ in the shaft, and with a set screw $c^7$ engaging the sleeve B'. D' D' indicates the supports for the bearings having flanges $d^2$ $d^2$ carrying the cups $d^3$ $d^3$ and E represents the balls. In this construction the bearings may be adjusted by loosening the set screws $c^7$ $c^7$ and rotating the sleeve B' with respect to the cones, which latter will be held stationary by their engagement with the shaft. The right and left threaded portions of the sleeve will move the cones simultaneously farther apart or nearer together according to the direction in which the sleeve is turned; and when the bearings are adjusted the screws $c^7$ are again tightened.

In Fig. 3, I have shown my invention applied to a pair of cone bearings, in which figure $A^2$ indicates the shaft having two cones $C^4$, $C^5$ mounted thereon, and engaging suitable cups $d^5$ supported in the flanges $d^4$ of bearing supports $D^2$. The cones are connected by the spreading tube $B^2$ and either of the arrangements shown in Figs. 1 and 2 may be applied to this construction. In the drawing I have shown the cone C provided with a pin $c^8$ connecting it rigidly with the sleeve $B^2$, the opposite end of the sleeve being threaded and screwed into the threaded recess of cone $C^5$ and secured by a set screw $c^9$. $c^{10}$ indicates the pin passing through cone $C^5$ and engaging a longitudinal key way or slot $a^2$ in the shaft.

It will be seen that in all of these constructions the shaft is permitted to slide longitudinally through the bearings to accommodate itself to any exigencies in its revolutions, which may be caused by intermeshing gears or any other cause producing slight end thrusts, without throwing appreciable pressure on either of the bearings, and thus relieving the bearings of a great deal of wear.

My invention is applicable, as is clearly shown in the drawings, and set forth herein, to ball bearings, and also to what are generally termed "cone bearings" in the latter of which the conical bearing faces of the cup and cone members engage each other directly. In the following claims, therefore, where I employ the terms cone or cone member, and cup or cup member, without specifically including the balls, I use these terms generically as covering the corresponding parts of either a cone bearing proper, or a ball bearing provided with cone and cup members having ball races between which the balls are held.

What I claim and desire to secure by Letters Patent is:—

1. The combination with stationary bearing cups, of a shaft extending therethrough, separate cone members directly engaging said shaft, a connection between said cones, out of contact with the shaft, for holding them in operative relation to said cups, a connection between said cones and said shaft, for causing them to rotate therewith but permitting the shaft to move longitudinally through said cones, substantially as described.

2. The combination with stationary bearing cups, of a shaft extending therethrough, separate cone members, having portions directly mounted upon said shaft, a sleeve surrounding said shaft out of contact therewith and having its ends connected to other portions of said cones, one of said cones being adjustably secured to said sleeve, and a connection between said cones and said shaft, for causing them to rotate therewith, but permitting the shaft to move endwise through said cones, substantially as described.

3. The combination with bearing cups, of a shaft extending therethrough, a pair of separate cones directly engaging said shaft, said cones having each a threaded portion of larger diameter than the shaft, a sleeve surrounding said shaft out of contact therewith, having its opposite ends threaded to engage the threaded portions of said cones, means for locking each of said cones with respect to said sleeve and a connection between said cones and said shaft, for causing them to rotate therewith but permitting the shaft to move longitudinally therethrough, substantially as described.

4. The combination with bearing cups having ball races, of a shaft extending therethrough, two separate cones, each having a part directly engaging said shaft, and a recessed portion of larger diameter than the shaft provided internally with screw threads, a sleeve surrounding said shaft, out of contact therewith, and having threaded end portions engaging the threaded recesses of said cones, balls interposed between said cones and said cups, devices extending through said cones and engaging said sleeve, to lock the said parts together in adjusted position, one of said cones being provided with a pin engaging a longitudinal recess in said shaft, for causing the cones to rotate therewith but permitting the shaft to move longitudinally through said cones, substantially as described.

In testimony whereof I affix my signature, in the presence of two witnesses.

WILLIAM H. COLDWELL.

Witnesses:
H. W. MURTFELDT,
A. W. MAPES.